(12) United States Patent
Iyer et al.

(10) Patent No.: US 12,164,966 B1
(45) Date of Patent: Dec. 10, 2024

(54) DYNAMIC TASK ALLOCATION AND DATASTORE SCALING

(71) Applicant: Snowflake Inc., Bozeman, MT (US)

(72) Inventors: Ganeshan Ramachandran Iyer, Redmond, WA (US); Raghav Ramachandran, Seattle, WA (US); Yang Wang, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/351,388

(22) Filed: Jul. 12, 2023

(51) Int. Cl.
  *G06F 9/50* (2006.01)
  *G06F 9/48* (2006.01)

(52) U.S. Cl.
  CPC .......... *G06F 9/5027* (2013.01); *G06F 9/4887* (2013.01)

(58) Field of Classification Search
  None
  See application file for complete search history.

(56) References Cited

U.S. PATENT DOCUMENTS

| | | | | |
|---|---|---|---|---|
| 8,505,018 B1 * | 8/2013 | Morgan | ................ | G06F 9/5088 718/104 |
| 8,943,252 B2 * | 1/2015 | Waters | .................... | G06F 9/505 710/267 |
| 10,007,500 B1 * | 6/2018 | Suraci | ....................... | G06F 8/61 |
| 2003/0084088 A1 * | 5/2003 | Shaffer | ................. | G06F 9/5044 718/104 |
| 2004/0158826 A1 * | 8/2004 | Bliss | ....................... | G06F 8/441 717/151 |
| 2008/0049254 A1 * | 2/2008 | Phan | ..................... | G06F 9/5038 358/1.16 |
| 2008/0077366 A1 * | 3/2008 | Neuse | .................. | H04L 41/147 703/2 |
| 2009/0248865 A1 * | 10/2009 | Kodama | ................. | G06F 9/505 709/224 |
| 2011/0113273 A1 * | 5/2011 | Okitsu | .................... | G06F 1/206 713/320 |
| 2013/0235209 A1 * | 9/2013 | Lee | .................. | H04N 21/23103 348/E7.086 |
| 2013/0246616 A1 * | 9/2013 | Park | ....................... | H04L 47/19 709/224 |

(Continued)

OTHER PUBLICATIONS

Peng et al.; "R-Storm: Resource-Aware Scheduling in Storm"; 2015 ACM; DOI: http://dx.doi.org/10.1145/2814576.2814808; (Peng_2015.pdf; pp. 149-161) (Year: 2015).*

(Continued)

*Primary Examiner* — Hiren P Patel
(74) *Attorney, Agent, or Firm* — Womble Bond Dickinson (US) LLP

(57) ABSTRACT

A system and method of dynamic task allocation and warehouse scaling. The method includes receiving a request to process a task. The method includes monitoring a plurality of execution nodes of a datastore to determine a plurality of central processing unit (CPU) utilizations. Each CPU utilization of the plurality of CPU utilizations is associated with a respective execution node of the plurality of execution nodes. The method includes identifying, by a processing device based on the plurality of CPU utilizations, a particular execution node associated with a maximum CPU utilization to process the task. The method includes allocating the task to the particular execution node.

27 Claims, 6 Drawing Sheets

(56) References Cited

U.S. PATENT DOCUMENTS

| | | | | |
|---|---|---|---|---|
| 2014/0122689 A1* | 5/2014 | Park | .................... | H04L 49/9068 |
| | | | | 709/224 |
| 2015/0180719 A1* | 6/2015 | Wu | ....................... | G06F 9/5083 |
| | | | | 709/224 |
| 2015/0186228 A1* | 7/2015 | Kumar | ................ | G06F 11/2028 |
| | | | | 714/4.12 |
| 2015/0347262 A1* | 12/2015 | Vyas | .................... | G06F 9/5022 |
| | | | | 718/104 |
| 2016/0170469 A1* | 6/2016 | Sehgal | ................. | G06F 9/5094 |
| | | | | 713/320 |
| 2017/0228257 A1* | 8/2017 | Dong | .................... | G06Q 10/04 |
| 2020/0034746 A1* | 1/2020 | Poitras | .................. | G06F 11/302 |
| 2020/0183758 A1* | 6/2020 | Subramaniam | ....... | G06F 9/4856 |
| 2020/0192604 A1* | 6/2020 | Byun | .................... | G06F 3/0611 |
| 2020/0250595 A1* | 8/2020 | Palani | .................... | G06N 20/00 |
| 2021/0287112 A1* | 9/2021 | Ramasamy | .............. | G06N 5/02 |
| 2022/0058044 A1* | 2/2022 | Ono | ....................... | G06F 9/5027 |
| 2023/0024143 A1* | 1/2023 | Li | ...................... | H04W 74/0833 |
| 2023/0116810 A1* | 4/2023 | Todi | ...................... | G06F 9/3555 |
| | | | | 718/105 |

OTHER PUBLICATIONS

Utrera et al.; "Task Packing: Efficient task scheduling in unbalanced parallel programs to maximize CPU utilization"; 0743-7315/ © 2019 Elsevier Inc.; https://doi.org/10.1016/j.jpdc.2019.08.003; (Utrera_2019.pdf; pp. 37-49) (Year: 2019).*

* cited by examiner

DYNAMIC TASK ALLOCATION AND DATASTORE SCALING

TECHNICAL FIELD

The present disclosure relates generally to cryptography, and more particularly, to systems and methods of dynamic task allocation and datastore scaling.

BACKGROUND

Data platforms are designed to connect businesses globally across many different workloads and unlock seamless data collaboration. One example of a data platform is a data warehouse, which is an enterprise system used for the analysis and reporting of structured and semi-structured data from multiple sources. Devices may use a data platform for processing and storing data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The conventional data platforms include a group of interconnected servers (e.g., processing devices) that are configured to process tasks using data. To avoid overloading the servers, the conventional data platforms set a fixed maximum number of tasks/slots per server and evenly distribute the tasks to the servers (without exceeding the fixed limit) in a load-balancing fashion. However, this approach causes the data platform to use the most servers and in the most inefficient manner to process data, which in turn, increases the overall power consumption of the data platform.

Aspects of the present disclosure address the above-noted and other deficiencies by dynamically allocating tasks to the data platform to allow the data platform to efficiently scale the data platform to the minimum size for processing the tasks. That is, the embodiments of the present disclosure maximize the computing capability of a minimum number of servers for processing tasks, and as a result, reduces the number of resources and the overall power consumption of the data platform.

As discussed in greater detail below, a resource manager is communicatively coupled to an execution platform that includes one or more data stores (e.g., data platform), each including one or more execution nodes (e.g., a processing device of server). The resource manager receives a request to process a task from a user device. The resource manager monitors a plurality of execution nodes (e.g., processing devices) of a datastore of the execution platform to determine a plurality of central processing unit (CPU) utilizations. Each CPU utilization of the plurality of CPU utilizations is associated with a respective execution node of the plurality of execution nodes. The resource manager identifies, based on the plurality of CPU utilizations, a particular execution node associated with a maximum CPU utilization to process the task. The resource manager allocates the task to the particular execution node.

Figure 1:
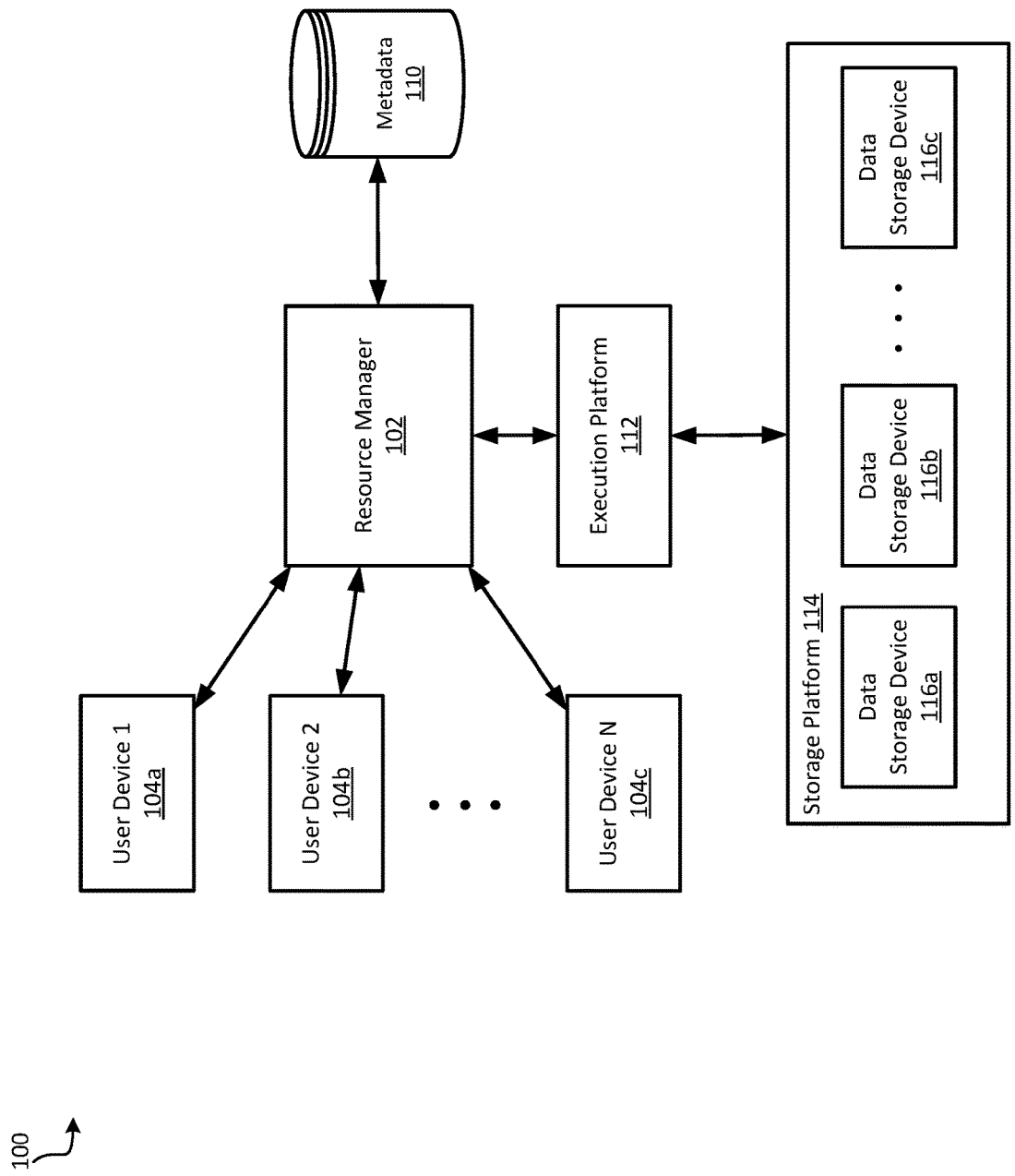
FIG. 1 is a block diagram depicting an example embodiment of a new data processing platform 100, according to some embodiments.

FIG. 1 is a block diagram depicting an example embodiment of a new data processing platform 100, according to some embodiments. As shown in FIG. 1, a resource manager 102 is coupled to multiple user devices 104 (e.g., user devices 104a, 104b, 104c, etc.). In particular implementations, resource manager 102 can support any number of user device desiring access to data processing platform 100. User device 104 may include, for example, end user device providing data storage and retrieval requests, system administrators managing the systems and methods described herein, and other components/devices that interact with resource manager 102. Resource manager 102 provides various services and functions that support the operation of all systems and components within data processing platform 100. As used herein, resource manager 102 may also be referred to as a "dynamic warehouse manager" that performs various functions as discussed herein.

Resource manager 102 is also coupled to metadata 110, which is associated with the entirety of data stored throughout data processing platform 100. In some embodiments, metadata 110 includes a summary of data stored in remote data storage systems as well as data available from a local cache. Additionally, metadata 110 may include information regarding how data is organized in the remote data storage systems and the local caches. Metadata 110 allows systems and services to determine whether a piece of data needs to be accessed without loading or accessing the actual data from a storage device.

Resource manager 102 is further coupled to an execution platform 112, which provides multiple computing resources that execute various data storage and data retrieval tasks, as discussed in greater detail below. Execution platform 112 is coupled to multiple data storage devices 116 (e.g., data storage device 116a, data storage device 116b, data storage device 116c, etc.) that are part of a storage platform 114. In some embodiments, the data storage devices 116 are cloud-based storage devices located in one or more geographic locations. For example, data storage devices 116 may be part of a public cloud infrastructure or a private cloud infrastructure. Data storage devices 116 may be hard disk drives (HDDs), solid state drives (SSDs), storage clusters, Amazon S3™ storage systems or any other data storage technology. Additionally, storage platform 114 may include distributed file systems (e.g., Hadoop Distributed File Systems (HDFS)), object storage systems, and/or the like.

In particular embodiments, the communication links between resource manager 102 and user devices 104, metadata 110, and execution platform 112 are implemented via one or more data communication networks. Similarly, the communication links between execution platform 112 and data storage devices 116 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 116 are decoupled from the computing resources associated with execution platform 112. This architecture supports dynamic changes to data processing platform 100 based on the changing data storage/retrieval needs as well as the changing needs of the users and systems accessing data processing platform 100. The support of dynamic changes allows data processing platform 100 to scale quickly in response to changing demands on the systems and components within data processing platform 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 102, metadata 110, execution platform 112, and storage platform 114 are shown in FIG. 1 as individual components. However, each of resource manager 102, metadata 110, execution platform 112, and storage platform 114 may be implemented as a distributed system (e.g., distributed across multiple systems/platforms at multiple geographic locations). Additionally, each of resource manager 102, metadata 110, execution platform 112, and storage platform 114 can be scaled up or down (independently of one another) depending on changes to the requests received from user devices 104 and the changing needs of data processing platform 100. Thus, in the described embodiments, data processing platform 100 is dynamic and supports regular changes to meet the current data processing needs.

During operation, data processing platform 100 processes multiple queries (or requests) received from any of the user devices 104. These queries are managed by resource manager 102 to determine when and how to execute the queries. For example, resource manager 102 may determine what data is needed to process the query and further determine which nodes within execution platform 112 are best suited to process the query. Some nodes may have already cached the data needed to process the query and, therefore, are good candidates for processing the query. Metadata 110 assists resource manager 102 in determining which nodes in execution platform 112 already cache at least a portion of the data needed to process the query. One or more nodes in execution platform 112 process the query using data cached by the nodes and, if necessary, data retrieved from storage platform 114. It is desirable to retrieve as much data as possible from caches within execution platform 112 because the retrieval speed is typically much faster than retrieving data from storage platform 114.

As shown in FIG. 1, data processing platform 100 separates execution platform 112 from storage platform 114. In this arrangement, the processing resources and cache resources in execution platform 112 operate independently of the data storage resources 116 in storage platform 114. Thus, the computing resources and cache resources are not restricted to specific data storage resources 116. Instead, all computing resources and all cache resources may retrieve data from, and store data to, any of the data storage resources in storage platform 114. Additionally, data processing platform 100 supports the addition of new computing resources and cache resources to execution platform 112 without requiring any changes to storage platform 114. Similarly, data processing platform 100 supports the addition of data storage resources to storage platform 114 without requiring any changes to nodes in execution platform 112.

Although FIG. 1 shows only a select number of computing devices (e.g., user device 104, resource manager 102), execution platforms (e.g., execution platform 112), and storage platforms (storage platform 114); the environment 100 may include any number of computing devices, execution platforms, and/or storage platforms that are interconnected in any arrangement to facilitate the exchange of data between the computing devices and the platforms. For example, the resource manager 102 may be coupled to multiple execution platforms 112. Additionally, the storage platform 114 may include any number of data storage devices 116*a*.

Figure 2:
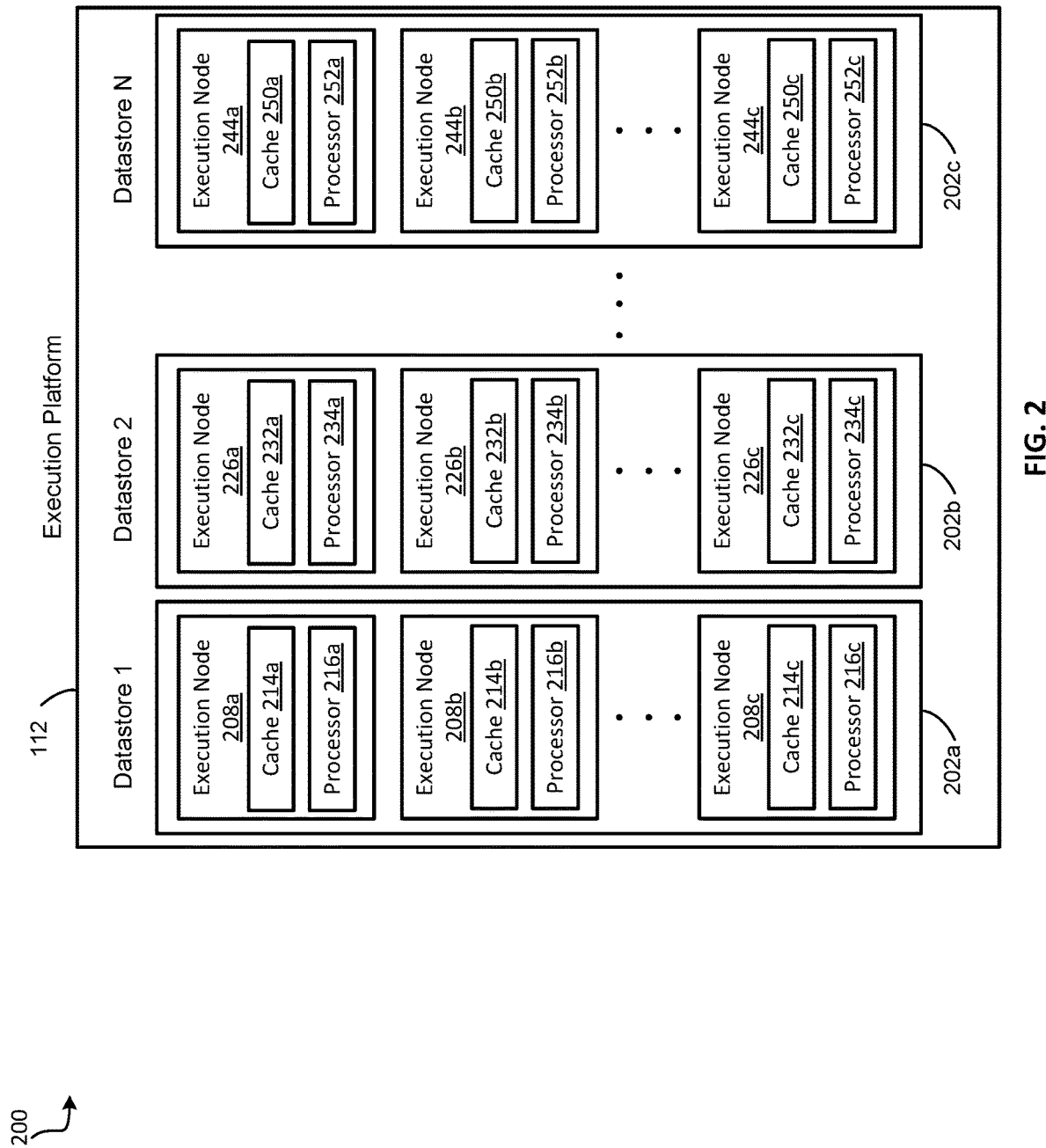
FIG. 2 is a block diagram depicting the execution platform of FIG. 1, according to some embodiments. The execution platform 112 includes multiple datastores 202 (e.g., datastores 204a, 204b, 204c), according to some embodiments.

FIG. 2 is a block diagram depicting the execution platform of FIG. 1, according to some embodiments. The execution platform 112 includes multiple datastores 202 (e.g., datastores 204*a*, 204*b*, 204*c*), according to some embodiments. Each datastore 202 includes multiple execution nodes that each include a data cache and a processor. Specifically, datastore 202*a* includes execution nodes 208 (e.g., execution nodes 208*a*, 208*b*, 208*c*), cache 214 (e.g., cache 214*a*. 214*b*, 214*c*), and processors 216 (e.g., processor 216*a*, 216*b*, 216*c*); datastore 202*b* includes execution nodes 226 (e.g., execution nodes 226*a*, 226*b*, 226*c*), cache 232 (e.g., cache 232*a*, 232*b*, 232*c*), and processors 234 (e.g., processor 234*a*, 234*b*, 234*c*); and datastore 202*c* includes execution nodes 244 (e.g., execution nodes 244*a*, 244*b*, 244*c*), cache 250 (e.g., cache 250*a*. 250*b*, 250*c*), and processors 252 (e.g., processor 252*a*, 252*b*, 252*c*). In some embodiments, an execution node may be a central processing unit (CPU).

Each execution node includes a cache and a processor. Specifically, with regard to datastore 202*a*, execution node 208*a* includes cache 214*a* and processor 216*a*; execution node 208*b* includes cache 214*b* and processor 216*b*; execution node 208*c* includes cache 214*c* and processor 216*c*. With regard to datastore 202*b*, execution node 226*a* includes cache 232*a* and processor 234*a*; execution node 226*b* includes cache 232*b* and processor 234*b*; execution node 226*c* includes cache 232*c* and processor 234*c*. With regard to datastore 202*c*, execution node 244*a* includes cache 250*a* and processor 252*a*; execution node 244*b* includes cache 250*b* and processor 252*b*; execution node 244*c* includes cache 250*c* and processor 252*c*.

Each of the execution nodes 208, 226, 244 is associated with processing one or more data storage and/or data retrieval tasks. For example, a particular datastore may handle data storage and data retrieval tasks associated with a particular user or customer. In other implementations, a particular datastore may handle data storage and data retrieval tasks associated with a particular data storage system or a particular category of data.

Datastores 202 are capable of executing multiple queries (and other tasks) in parallel by using the multiple execution nodes. As discussed herein, execution platform 112 can add new datastores and drop existing datastores in real time based on the current processing needs of the systems and users. This flexibility allows execution platform 112 to quickly deploy large amounts of computing resources when needed without being forced to continue paying for those computing resources when they are no longer needed. All datastores can access data from any data storage device (e.g., any storage device in storage platform 114 in FIG. 1).

A datastore may be any type of system used for the processing and reporting of structured and semi-structured data from multiple sources, including for example, one or more database servers, a data warehouse, a virtual warehouse, a data lake, a data pond, a data mesh, and/or the like.

Figure 3:
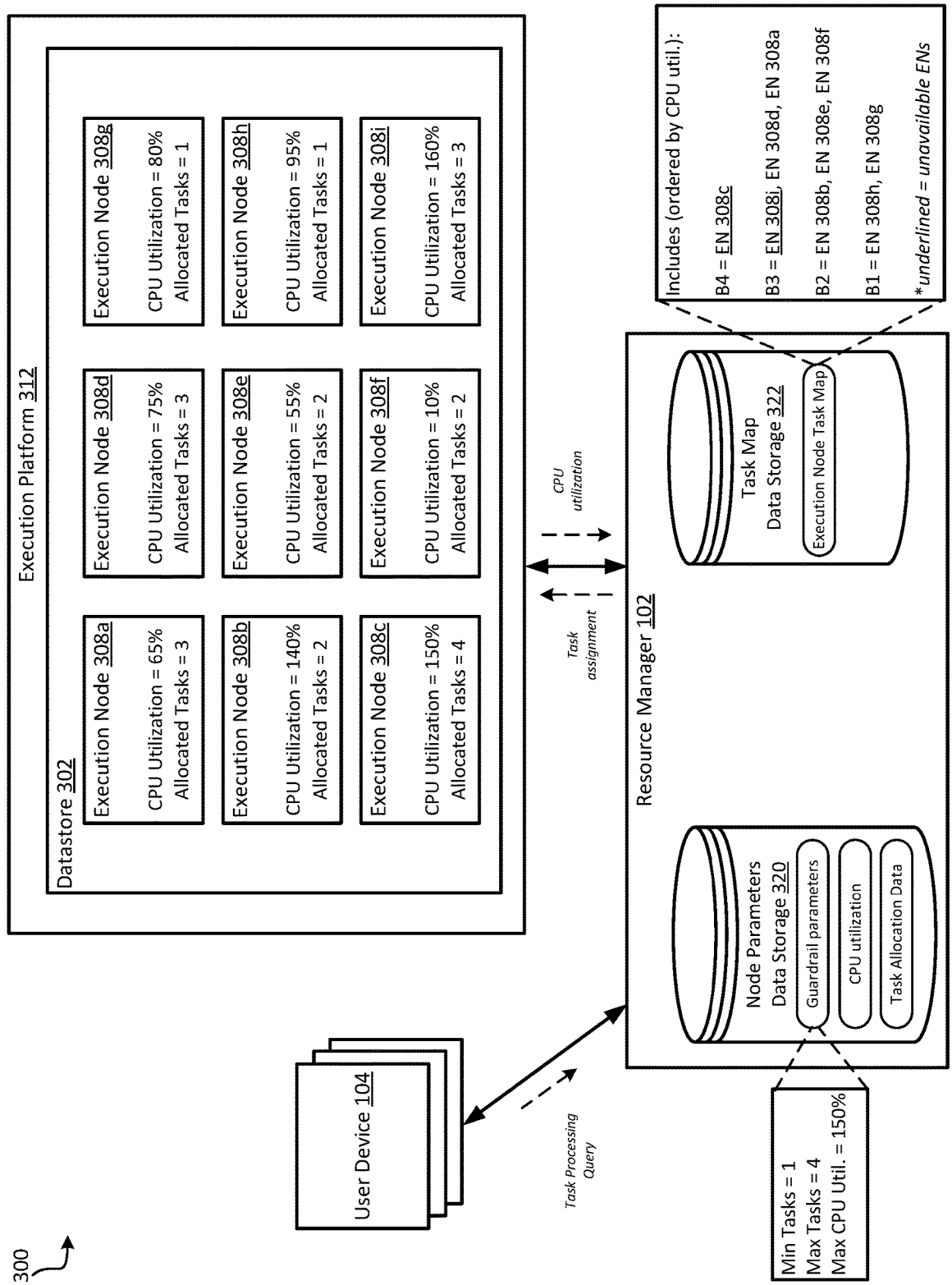
FIG. 3 is a block diagram depicting an example environment for dynamic task allocation of a datastore, according to some embodiments.

Although each datastore 202 shown in FIG. 3 includes three execution nodes, a particular datastore may include any number of execution nodes. Further, the number of execution nodes in a datastore is dynamic, such that new execution nodes are created when additional demand is present, and existing execution nodes are deleted when they are no longer necessary.

Each datastore 202 is capable of accessing any of the data storage devices 116 shown in FIG. 1. Thus, datastores 202 are not necessarily assigned to a specific data storage device 116 and, instead, can access data from any of the data storage devices 116. Similarly, each of the execution nodes shown in FIG. 2 can access data from any of the data storage devices 116. In some embodiments, a particular datastore or a particular execution node may be temporarily assigned to a specific data storage device, but the datastore or execution node may later access data from any other data storage device.

In some embodiments, the execution nodes shown in FIG. 2 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 2 each include one data cache and one processor, alternate embodiments may include execution nodes containing any number of processors and any number of caches. Additionally, the caches may vary in size among the different execution nodes. The caches shown in FIG. 2 store, in the local execution node, data that was retrieved from one or more data storage devices in storage platform 114 in FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in storage platform 114.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although datastores 202 are associated with the same execution platform 112, the datastores 202 may be implemented using multiple computing systems at multiple geographic locations. For example, datastore 202a can be implemented by a computing system at a first geographic location, while datastores 202b and 202c are implemented by another computing system at a second geographic location. In some embodiments, these different computing systems are cloud-based computing systems maintained by one or more different entities.

Additionally, each datastore 202 is shown in FIG. 2 as having multiple execution nodes. The multiple execution nodes associated with each datastore 202 may be implemented using multiple computing systems at multiple geographic locations. For example, a particular instance of datastore 202 implements execution nodes 308a-c on one computing platform at a particular geographic location, and implements execution nodes 308d-308f at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the datastore.

Execution platform 112 is also fault tolerant. For example, if one datastore 202 fails, that datastore 202 is quickly replaced with a different datastore 202 at a different geographic location.

A particular execution platform 112 may include any number of datastores 202. Additionally, the number of datastores 202 in a particular execution platform 112 is dynamic, such that new datastores 202 are created when additional processing and/or caching resources are needed. Similarly, existing datastores 202 may be deleted when the resources associated with the datastore 202 are no longer necessary.

In some embodiments, each of the datastores 202 may operate on the same data in storage platform 114, but each datastore 202 has its own execution nodes with independent processing and caching resources. This configuration allows requests on different datastores 202 to be processed independently and with no interference between the requests. This independent processing, combined with the ability to dynamically add and remove datastores 202, supports the addition of new processing capacity for new users without impacting the performance observed by the existing users.

FIG. 3 is a block diagram depicting an example environment for dynamic task allocation of a datastore, according to some embodiments. Specifically, the environment 300 shows how the resource manager 102 in FIG. 1 may be configured to use a bucket-based approach to identify and select a particular execution node from a plurality of executions of a datastore to process a task. By selecting the particular execution node to process the task instead of other execution nodes of the datastore, the resource manager 102 is able to eventually decommission one or more of the other execution nodes of the datastore, which in turn, reduces the overall power consumption and/or resource utilization of the datastore 302. As shown in FIG. 3, the environment 300 includes one or more user devices 104, resource manager 102, and an execution platform 312 that are each communicatively coupled to one another via a communication network. The execution platform 212, which may correspond to execution platform 212 in FIG. 2, includes datastore 302, which may correspond to datastore 202a (datastore 1), datastore 202b (datastore 2), or any other datastore 202c (datastore N) in FIG. 2.

The datastore 302 includes execution node 308a, execution node 308b, execution node 308c, execution node 308d, execution node 308e, execution node 308f, execution node 308g, execution node 308h, and execution node 308i (collectively referred to as, execution nodes 308). Each execution node 308 may correspond to a respective execution node within the particular datastore in FIG. 2. For example, if datastore 302 corresponds to datastore 202a in FIG. 2, then execution node 308a corresponds to execution node 208a of datastore 202a, execution node 308b corresponds to execution node 208b of datastore 202a, and execution node 308c corresponds to execution node 208c of datastore 202a. Each of the remaining execution nodes 308d-308i then respectively correspond to one of the other execution nodes of datastore 202a. Although FIG. 3 only shows a single datastore 302, the resource manager 102 in FIG. 3 may perform the same dynamic task allocation procedure, as described herein, for any other datastores 302 (e.g., datastore 202b, datastore 202c, etc.) that are communicatively coupled to the resource manager 102. Furthermore, although FIG. 3 shows that datastore 302 only includes a select number of execution node (e.g., execution nodes 308a-308i), a datastore may include any number (e.g., 1 or multiple) of execution nodes.

Each execution node 308 is configured to receive one or more tasks (sometimes referred to as, queries, allocated tasks, task assignment) from the resource manager 102, store the tasks in its local queue (e.g., a collection of tasks that are maintained in a chronological sequence), and process the tasks in the order in which they are received. The execution node 308 uses a percentage of its processing/computing capability (e.g., CPU utilization) to process the task. That is, a CPU time or process time is the amount of time for which a central processing unit, such as an execution node 308, is used for processing instructions (e.g., a task) of a computer program or operating system. The CPU time may be measured in clock ticks or seconds. A CPU utilization (or CPU usage) is a measurement of CPU time as a percentage of the CPU's capacity.

FIG. 3 depicts an example snapshot of the CPU utilization for each execution node 308 of the datastore 302. Specifically, at a particular snapshot (referred to herein as snapshot 1) of the datastore 302, the execution node 308a has a CPU utilization of 65% and has 3 allocated tasks, execution node 308b has a CPU utilization of 140% and has 2 allocated tasks, execution node 308c has a CPU utilization of 150% and has 4 allocated tasks, execution node 308d has a CPU utilization of 75% and has 3 allocated tasks, execution node 308e has a CPU utilization of 55% and has 2 allocated tasks, execution node 308f has a CPU utilization of 10% and has 2 allocated tasks, execution node 308g has a CPU utilization of 80% and has 1 allocated task, execution node 308h has a CPU utilization of 95% and has 1 allocated task, and execution node 308i has a CPU utilization of 160% and has 3 allocated tasks. The CPU utilization for each execution node 308 is based on the number of tasks allocated to the execution node 308 and the amount of work the execution node 308 performs to execute the task. Thus, different snapshots of the execution node performance at different moments in time can show how these values (e.g., CPU utilization and allocated task) change over time.

The allocated tasks of an execution node 308 may, in some embodiments, refer to the total number of tasks in the queue of the execution node 308 plus whether the execution node 308 is currently processing a task. For example, execution node 308a has 3 allocated tasks because the execution node 308a has two tasks in its queue and is currently processing a third task.

To perform some tasks, in some embodiments, the execution node 308 first downloads one or more files from a remote storage (e.g., cloud, internet, etc.). As the execution node 308 waits for the one or more files to be fully downloaded, its CPU utilization may be drastically reduced. The resource manager 102 is aware of these moments of time when the execution node is downloading files because the resource manager 102 is continually monitoring the CPU utilization of the execution node 308. Thus, the resource manager 102 may maximize the capability of the execution node 308 by allocating additional tasks to the execution node 308 to cause the execution node 308 to process the additional tasks during the moments of time when the execution node 308 is waiting for the files to be downloaded.

The resource manager 102 may define (e.g., initialize, set) guardrail parameters (e.g., limits) which the resource manager 102 uses to prevent an overallocation of tasks onto the execution nodes 408. Specifically, the resource manager 102 may define a minimum task parameter (e.g., MIN_TASK-S_PER_SERVER) for one or more execution nodes 408 of the data store to indicate the minimum number of tasks to be allocated to each execution node 308 associated with the guardrail parameter. The resource manager 102 may enforce the minimum task parameter by determining whether the minimum number of tasks (e.g., 1 task) are currently allocated to an execution node, and if not, then the resource manager 102 may prioritize and/or select that execution node 308 (over the other the execution nodes 308 in the datastore 302) when determining which execution node 308 should be assigned the next task awaiting processing. For example, the resource manager 102 may determine that execution node 308a currently has 0 queued tasks in its queue and that its corresponding minimum task parameter indicates that the execution node 308a should have no less than 1 queued task to achieve an optimal use of the resources of the datastore 302. Therefore, the resource manager 102 may decide to select the execution node 308a to process the next task that the resource manager 102 is scheduled to assign for processing, so to ensure that the execution node 308a conforms to the minimum task parameter. In some embodiments, however, the resource manager 102 may allow one or more execution nodes 308 of the datastore 302 to drop below the minimum task parameter by allocating, during a particular time frame, fewer tasks or no tasks to the one or more execution nodes 408 if the resource manager 102 seeks to eventually decommission the one or more execution nodes 308 to save on overall power consumption and/or resource utilization of the datastore 302.

The resource manager 102 may define a maximum task parameter (e.g., MAX_TASKS_PER_SERVER) for one or more execution nodes 308 of the datastore 302 to indicate the maximum number of tasks that can be allocated to each execution node 308 associated with the guardrail parameter. The resource manager 102 may enforce the maximum task parameter by determining whether the maximum number of tasks (e.g., 4 tasks) are currently allocated to a particular execution node (e.g., execution node 308a), and if yes, then the resource manager 102 may prevent additional tasks from being allocated to the particular execution node 308 by prioritizing and/or selecting one or more of the other execution nodes (e.g., 308b-308i) of the datastore 302, instead of the particular execution node 308, to process the next task awaiting processing. The resource manager 102 may determine a boundary for tasks per execution node 308 based on a difference between the maximum number of tasks per execution node 308 and the minimum task per execution node 308. The resource manager 102 may allocate tasks to the one or more execution nodes 308 of the datastore 302 based on the boundary for tasks per execution node 308.

The resource manager 102 may define a maximum CPU utilization parameter (e.g., MAX_CPU_UTILIZATION_PERCENTAGE) for one or more execution nodes 408 of the datastore to indicate the maximum CPU utilization that is permitted by each execution node associated with the guardrail parameter. In some embodiments, the CPU utilization parameter may be a global parameter that applies to all execution nodes 408 in the datastore. The resource manager 102 may avoid allocating an additional task to an execution node 408 if that additional task would cause the CPU utilization of the execution node 408 to exceed the maximum CPU utilization parameter associated with the execution node 408.

With reference to the above example, FIG. 3 depicts an example snapshot of the guardrail parameters associated with the execution nodes 308 of the datastore at snapshot 1. Specifically, the minimum task parameter is 1, the maximum task parameter is 4, and the maximum CPU utilization parameter is 150%. However, the resource manager 102 is free to redefine one or more of these guardrail parameters at different snapshots/moments of time.

The resource manager 102 may define the guardrail parameters for different groups of execution nodes 308 of the datastore 302 to different values. For example, the resource manager 102 may define a first group of guardrail parameters for a first group of execution nodes that includes execution nodes 308a, 308b, 308c; a second group of guardrail parameters for a second group of execution nodes that includes execution nodes 308d, 308e, 308f; and a third group of guardrail parameters for a third group of execution nodes that includes execution nodes 308g. 308h, 308i. The different groups of guardrail parameters may be initialized to different values. Alternatively, the resource manager 102 may define one or more of the guardrail parameters as global parameters that equally apply to all execution nodes 308 of the datastore 302. For example, as shown in FIG. 1, the resource manager 102 may globally set the minimum number of tasks for all execution nodes 308 of datastore 302 to 1, globally set the maximum number of tasks for all execution nodes 308 to 4, and globally set the maximum CPU utilization parameter for all execution nodes 308 to 150%.

The resource manager 102 stores the guardrail parameters in the node parameters data storage 206.

The resource manager 102 may adjust (e.g., modify, redefine) one or more of these guardrail parameters (e.g., minimum task parameter, maximum task parameter, and/or maximum CPU utilization parameter) at any time to maintain an optimal balance of minimum latency to process tasks, minimum power consumption to process tasks, and minimize resources (e.g., execution nodes) to process the task. For example, the resource manager 102 may determine that a minimum task parameter of 12 tasks might (or has) caused one or more of the execution nodes 308 of the datastore 302 to be overloaded (e.g., overburdened), resulting in an increase in processing latency, and/or excess power consumption on those execution nodes 308. In response, the resource manager 102 may repeatedly reduce the minimum task parameter by an increment step size (e.g., 11 tasks, 10 tasks, and so on) until the processing latency and/or power consumption for those execution nodes 308 have achieved an optimal balance between these guardrail parameters, while maximizing the current CPU utilization of the execution node 308.

The resource manager 102 may monitor the current CPU utilization of each of the execution nodes 308 of the datastore 312. The resource manager 102 may send a request to each of the execution nodes 308 for the execution nodes 308 to begin periodically reporting their current CPU utilization to the resource manager 102. Upon receiving the CPU utilizations, the resource manager 102 assigns a time stamp to each of the CPU utilizations and stores the CPU utilizations and time stamps in the node parameters data storage 130. The execution nodes 308 may periodically report their current CPU utilization to the resource manager 102 based on an elapse of time (e.g., every second, every minute, and/or the like) and/or whenever a particular event occurs, such as, when the execution node 102 begins processing the next task in its queue or when the CPU utilization of the execution node 308 increases or decreases by a particular amount (e.g., 1%, 2%, etc.) as compared to the CPU utilization of a previous time frame (e.g., prior 30 seconds, 60 seconds, 1 minute, etc.).

The resource manager 102 may keep track of which tasks (e.g., task 1, task 2, task 3, etc.) it assigns (e.g., allocates, distributes) to which execution node 308 of the datastore 302, as well as the time stamp in which the resource manager 102 assigns the particular task to the particular execution node 308. The resource manager 102 stores this information (referred to herein as, task allocation data) in the node parameter data storage 320. The task allocation data also indicates the chronological order of the tasks that are in each of the queues of the execution nodes 308. In some embodiments, the load average statistics for an execution node 308 may lag (e.g., delayed) by a particular lag amount (e.g., second, minutes), and if so, the resource manager 102 may avoid allocating tasks to the execution nodes 308 for up to a particular delay amount that is equal to the lag amount. For example, if the resource manager 102 determines that the load average statistics for execution node 308b is 5 seconds, then the resource manager 102 may wait (e.g., pause) for 5 seconds before allocating (e.g., assigning) tasks to any of the execution nodes 308 of the datastore 302.

The resource manager 102 may receive a request to process a task from a user device 104. In response, the resource manager 102 identifies and selects an execution node 308 of the datastore 302 to process the task according to a bucket-based approach. To identify and select an execution node 308, the resource manager 102 generates an execution node task map that includes an association between a plurality of buckets and a plurality of identifiers of the execution nodes 308. The resource manager 102 generates the execution node task map by grouping (e.g., categorizing) each identifier of the execution nodes 308 into one of the buckets of the plurality of buckets, according to the number of tasks allocated to the execution node 308, such that each bucket includes the identifiers of the execution nodes 308 having the same number of allocated tasks. Furthermore, the resource manager 102 orders (e.g., sorts) the identifiers of the execution nodes 308 according to their CPU utilization.

As shown in FIG. 3, the resource manager 102 generates an execution node task map that includes bucket_4 (shown in FIG. 3 as B4) corresponding to execution nodes ("EN") having 4 allocated tasks, bucket_3 (shown in FIG. 3 as B3) corresponding to execution nodes having 3 allocated tasks, bucket_2 (shown in FIG. 3 as B2) corresponding to execution nodes having 2 allocated tasks, and bucket_1 (shown in FIG. 3 as B1) corresponding to execution nodes having 1 allocated tasks. Specifically, bucket_4 includes EN 308*c* (150%); bucket_3 includes EN 308*i* (160%), EN 308*d* (75%), EN 308*a* (65%); bucket_2 includes EN 308*b* (140%), EN 308*e* (55%), and EN 308*f* (10%); and bucket_1 includes EN 308*h* (95%) and EN 308*g* (80%); where each identifier of each execution node 308 is ordered in each bucket according to its current CPU utilization.

The resource manager 102 stores the execution node task map in the node parameter data storage 320. This way, the resource manager 102 may retrieve the execution node task map when making decisions about how to allocate other tasks and without having to regenerate the execution node task map. However, in other embodiments, the resource manager 102 may regenerate the execution node task map for each task request that it receives from a user device 104 or if the resource manager 102 knows that the execution node task map is no longer reflective of the current CPU utilizations of the execution nodes 308.

The resource manager 102 checks whether the status of each execution node 308 conforms to the guardrail parameters, and if not, excludes (e.g., removes, omits, disregards) the execution node from the execution node task map or marks the execution node task map to indicate that those execution nodes 308 cannot be allocated any new tasks because they are unavailable according to the guardrail parameters. As shown in FIG. 3, the resource manager 102 marks the execution node task map to indicate that EN 308*c* is unavailable because its 4 allocated tasks equal to or exceeds the maximum number of 5 tasks that are allowed per execution node 308. The resource manager 102 also marks the execution node task map to indicate that EN 308*i* is unavailable because its CPU utilization of 160% is equal to or exceeds the maximum number of tasks of 150% that is allowed per execution node 308.

The resource manager 102 may calculate a number of available slots to allocate a task to an execution node 308 by subtracting the allocated tasks of the execution node from the maximum task parameter (e.g., 4 tasks) associated with the execution node 308. For example, the resource manager 102 may determine that execution node 308*a* has 1 available slot, execution node 308*b* has 2 available slots, execution node 308*c* has 0 available slots, execution node 308*d* has 1 available slot, execution node 308*e* has 2 available slots, execution node 308*f* has 2 available slots, execution node 308*g* has 3 available slots, execution node 308*h* has 3 available slots, and execution node 308*i* has 1 available slot.

The resource manager 102 allocates the task to the execution node 308 that is most loaded (e.g., highest CPU utilization), but within the guardrail parameters. Therefore, the resource manager 102 selects execution node 308*d* because the execution node task map indicates that execution node 308*d* has the highest CPU utilization of the execution nodes 308 and is within the guardrail parameters. In some embodiments, the resource manager 102 decides which execution node 308 should execute the task based on CPU utilization and without taking into consideration any potential impact on memory utilization.

By allocating tasks to the execution nodes 308 that are most loaded, the resource manager 102 is able to use the fewest number of execution nodes 308 of the datastore 302 to perform the tasks. The resource manager 102 may then scale the size of the datastore by decommissioning one or more of the other execution nodes 308 of the datastore 302 that are not currently processing tasks. The resource manager 102 may decommission an execution node 102 by powering down the execution node 102 or forcing the execution node 102 into a low-powered stated, both of which reduce an overall power consumption for the datastore.

The resource manager 102 decides whether to decommission one or more of the other execution nodes 308 of the datastore 302 based on whether the execution nodes 308 are idle (e.g., not processing a task) and their queues are empty, and whether the resource manager 102 is unlikely to assign a task to the execution node 308 in the near future. The resource manager 102 makes this decision based on a dynamic allocation procedure by predicting the number of execution nodes 308 the datastore 302 might need to process future tasks based on an estimated number of execution nodes 308 that the datastore has historically used to process tasks. This dynamic allocation approach is in contrast to the conventional system, which allocates a plurality of tasks to the execution nodes of a datastore by defining a fixed number of tasks per execution node and dividing the total number of pending tasks by the fixed number of tasks per execution node to determine the total number of execution nodes needed to process the pending tasks.

To implement the dynamic allocation procedure, the resource manager 102 estimates the number of execution nodes 308 for processing tasks based on a historical moving average of tasks. That is, with the number of tasks no longer a fixed number, the resource manager 102 is able to track the moving average of tasks per execution node 308. In some embodiments, instead of using the moving average, the resource manager 102 may estimate the number of execution nodes 308 for processing the tasks based on other statistic values including, for example, median value, mean value, mode value, and/or max value.

The resource manager 102 tracks and maintains a first moving average over a first time window (e.g., 10 seconds) and a second moving average over a second time window (e.g., 15 second window), and then selects the maximum moving average value from the time windows that is also equal to or above the minimum task parameter (e.g., 1 task) for the execution nodes 408 of the data store 302. The resource manager 102 uses the selected maximum moving average as the minimum number of execution nodes for processing tasks. The resource manager 102 scales the datastore 302 based on the minimum number of execution nodes. For example, the resource manager 102 begins decommissioning execution nodes 308 that are idle until the total number of execution nodes equals the minimum number of execution nodes, and then stops decommissioning execution nodes 308 even if there still are one or more execution nodes 308 that are idle.

Figure 4:
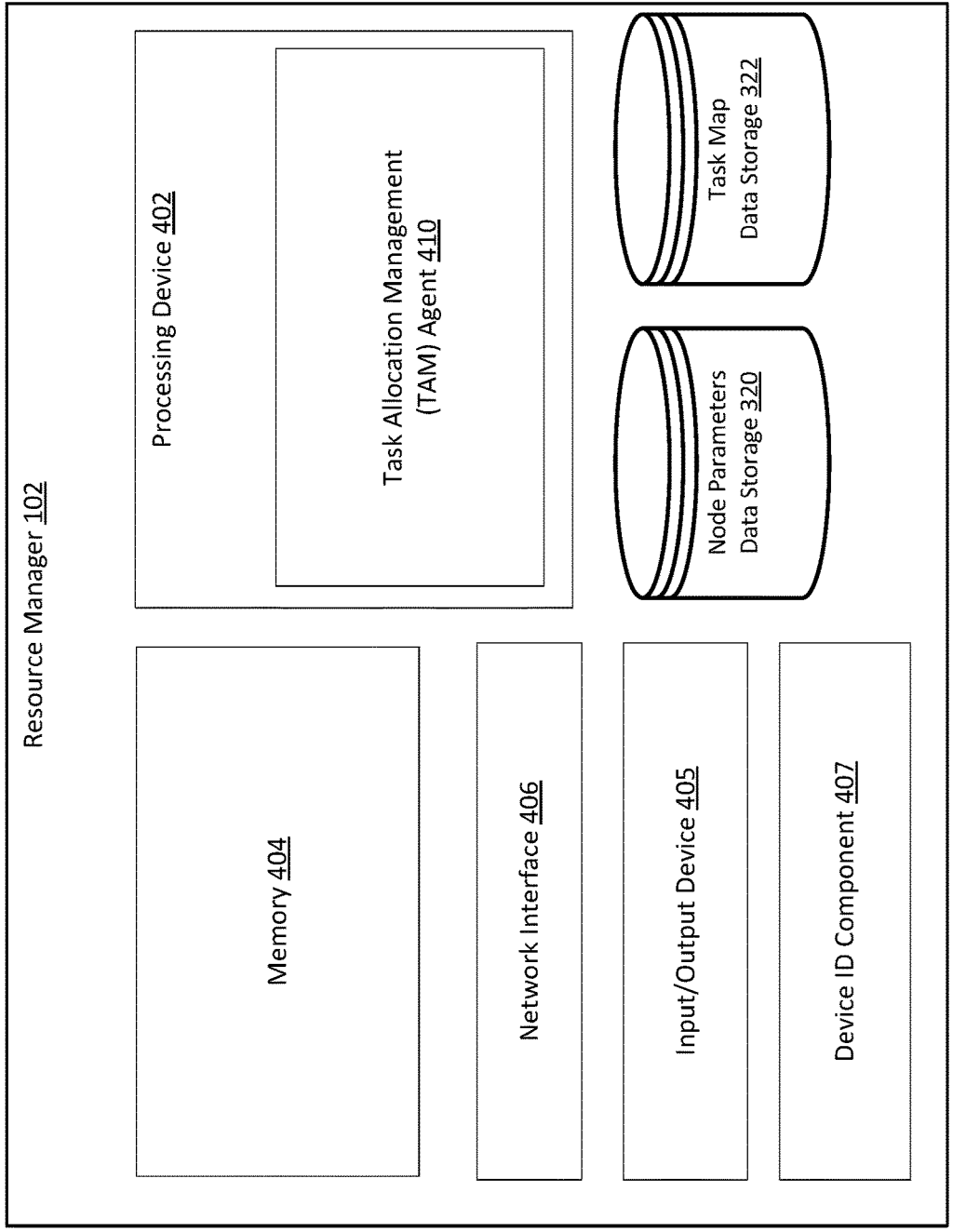
FIG. 4 is a block diagram depicting an example of the resource manager 102 in FIG. 1 according to some embodiments.

FIG. 4 is a block diagram depicting an example of the resource manager 102 in FIG. 1 according to some embodiments. While various devices, interfaces, and logic with particular functionality are shown, it should be understood that the resource manager 102 includes any number of devices and/or components, interfaces, and logic for facilitating the functions described herein. For example, the activities of multiple devices may be combined as a single device and implemented on a same processing device (e.g., processing device 402), as additional devices and/or components with additional functionality are included.

The resource manager 102 includes a processing device 402 (e.g., general purpose processor, a PLD, etc.), which may be composed of one or more processors, and a memory 404 (e.g., synchronous dynamic random-access memory (DRAM), read-only memory (ROM)), which may communicate with each other via a bus (not shown).

The processing device 402 may be provided by one or more general-purpose processing devices such as a microprocessor, central processing unit, or the like. In some embodiments, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 402 may include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

The memory 404 (e.g., Random Access Memory (RAM), Read-Only Memory (ROM), Non-volatile RAM (NVRAM), Flash Memory, hard disk storage, optical media, etc.) of processing device 402 stores data and/or computer instructions/code for facilitating at least some of the various processes described herein. The memory 404 includes tangible, non-transient volatile memory, or non-volatile memory. The memory 404 stores programming logic (e.g., instructions/code) that, when executed by the processing device 402, controls the operations of the resource manager 102. In some embodiments, the processing device 402 and the memory 404 form various processing devices and/or circuits described with respect to the resource manager 102. The instructions include code from any suitable computer programming language such as, but not limited to, C, C++, C#, Java, JavaScript, VBScript, Perl, HTML, XML, Python, TCL, and Basic.

The processing device 402 may include and/or execute a task allocation management (TAM) agent 410 that may be configured to receive a request to process a task from a user device 104. The TAM agent 410 may be configured to monitor (e.g., track) a plurality of execution nodes 308 of one or more datastores 202 of the execution platform 112 to determine a plurality of central processing unit (CPU) utilizations. Each CPU utilization of the plurality of CPU utilizations is associated with a respective execution node (e.g., execution node 208a, execution node 208b, or the like) of the plurality of execution nodes 308. The TAM agent 410 may be configured to identify, based on the plurality of CPU utilizations, a particular execution node (e.g., execution node 208a, execution node 208b, or the like) that is associated with a maximum CPU utilization from among the plurality of CPU utilizations to process the task indicated in the request from the user device 104. The TAM agent 410 may be configured to allocate the task to the particular execution node 308.

The TAM agent 410 may be configured identify, based on the plurality of CPU utilizations, a second execution node associated with a minimum CPU utilization of the plurality of CPU utilizations. In some embodiments, the minimum CPU utilization may correspond to 0% CPU utilization or any CPU utilization value indicative of the execution node 308 not processing a task. The TAM agent 410 may be configured to decommission the second execution node responsive to identifying the second execution node being associated with the minimum CPU utilization of the plurality of CPU utilizations.

The TAM agent 410 may be configured to generate a mapping (e.g., execution node task map) including a plurality of identifiers that are associated with the plurality of CPU utilizations. The TAM agent 410 may be configured to store the mapping in the node parameters data storage 320.

The TAM agent 410 may be configured to remove, based on one or more guardrail parameters, a second execution node of the plurality of execution nodes 308 as a possible candidate to process the task. In some embodiments, the one or more guardrail parameters may indicate at least one of a minimum task per execution node (e.g., 5 tasks, etc.), a maximum task per execution node (e.g., 20 tasks), or a maximum CPU utilization execution node (e.g., 160%).

The TAM agent 410 may be configured to calculate (e.g., measure) a first moving average of tasks per execution node 308 to process a first set of historical tasks. The TAM agent 410 may be configured to calculate a second moving average of tasks per execution node to process a second set of historical tasks. A historical task may be, for example, a task that was previously processed by one or more execution nodes 308 of the execution platform 112. The TAM agent 410 may be configured to calculate a minimum number of tasks per execution node based on the first moving average and the second moving average. For example, the TAM agent 410 may be configured determine that the first moving average exceeds the second moving average; and in response, define the minimum number of tasks per execution node as the first moving average.

The TAM agent 410 may be configured to identify, based on the plurality of CPU utilizations, a third execution node of the plurality of execution nodes 308 as being associated with a minimum CPU utilization of the plurality of CPU utilizations. The TAM agent 410 may be configured to remove, based on one or more guardrail parameters, the third execution node of the plurality of execution nodes 308 as a possible candidate for decommission in order to ensure that the datastore 202 conforms to the minimum number of tasks per execution node.

The TAM agent 410 may be configured to determine that a particular task allocated to a second execution node of the plurality of execution nodes involves downloading one or more files for a duration of time from a remote storage (e.g., internet, cloud server, or the like). The TAM agent 410 may be configured to allocate one or more additional tasks to the second execution node to cause the second execution node to process the one or more additional tasks during the duration of time.

In some embodiments, one or more of the execution nodes 308 of a datastore 202 include a local queue that includes a plurality of task slots.

The TAM agent 410 may be configured to determine that a particular execution node 308 of the datastore 202 includes only one available task slot in its plurality of task slots for processing a task. Based on this determination, the TAM agent 410 may determine that assigning the task to the particular execution node 308 would result in maximizing the CPU utilization of the particular execution node 308 more than if the TAM agent 410 assigned the task to any of the other execution nodes 308 of the datastore 202. Based on the latter determination, the TAM agent 410 may assign the task to the particular execution node 308.

The resource manager 102 includes a network interface 406 configured to establish a communication session with a computing device for sending and receiving data over the communication network 120 to the computing device. Accordingly, the network interface 406 includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the resource manager 102 includes a plurality of network interfaces 406 of different types, allowing for connections to a variety of networks, such as local area networks (public or private) or wide area networks including the Internet, via different sub-networks.

The resource manager 102 includes an input/output device 405 configured to receive user input from and provide information to a user. In this regard, the input/output device 405 is structured to exchange data, communications, instructions, etc. with an input/output component of the resource manager 102. Accordingly, input/output device 405 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of resource manager 102, such as a built-in display, touch screen, microphone, etc., or external to the housing of resource manager 102, such as a monitor connected to resource manager 102, a speaker connected to resource manager 102, etc., according to various embodiments. In some embodiments, the resource manager 102 includes communication circuitry for facilitating the exchange of data, values, messages, and the like between the input/output device 405 and the components of the resource manager 102. In some embodiments, the input/output device 405 includes machine-readable media for facilitating the exchange of information between the input/output device 405 and the components of the resource manager 102. In still another embodiment, the input/output device 405 includes any combination of hardware components (e.g., a touchscreen), communication circuitry, and machine-readable media.

The resource manager 102 includes a device identification component 407 (shown in FIG. 4 as device ID component 407) configured to generate and/or manage a device identifier associated with the resource manager 102. The device identifier may include any type and form of identification used to distinguish the resource manager 102 from other computing devices. In some embodiments, to preserve privacy, the device identifier may be cryptographically generated, encrypted, or otherwise obfuscated by any device and/or component of resource manager 102. In some embodiments, the resource manager 102 may include the device identifier in any communication (e.g., remedial action messages, etc.) that the resource manager 102 sends to a computing device.

The resource manager 102 includes a bus (not shown), such as an address/data bus or other communication mechanism for communicating information, which interconnects the devices and/or components of resource manager 102, such as processing device 402, network interface 406, input/output device 405, and device ID component 407.

In some embodiments, some or all of the devices and/or components of resource manager 102 may be implemented with the processing device 402. For example, the resource manager 102 may be implemented as a software application stored within the memory 404 and executed by the processing device 402. Accordingly, such embodiment can be implemented with minimal or no additional hardware costs. In some embodiments, any of these above-recited devices and/or components rely on dedicated hardware specifically configured for performing operations of the devices and/or components.

Figure 5:
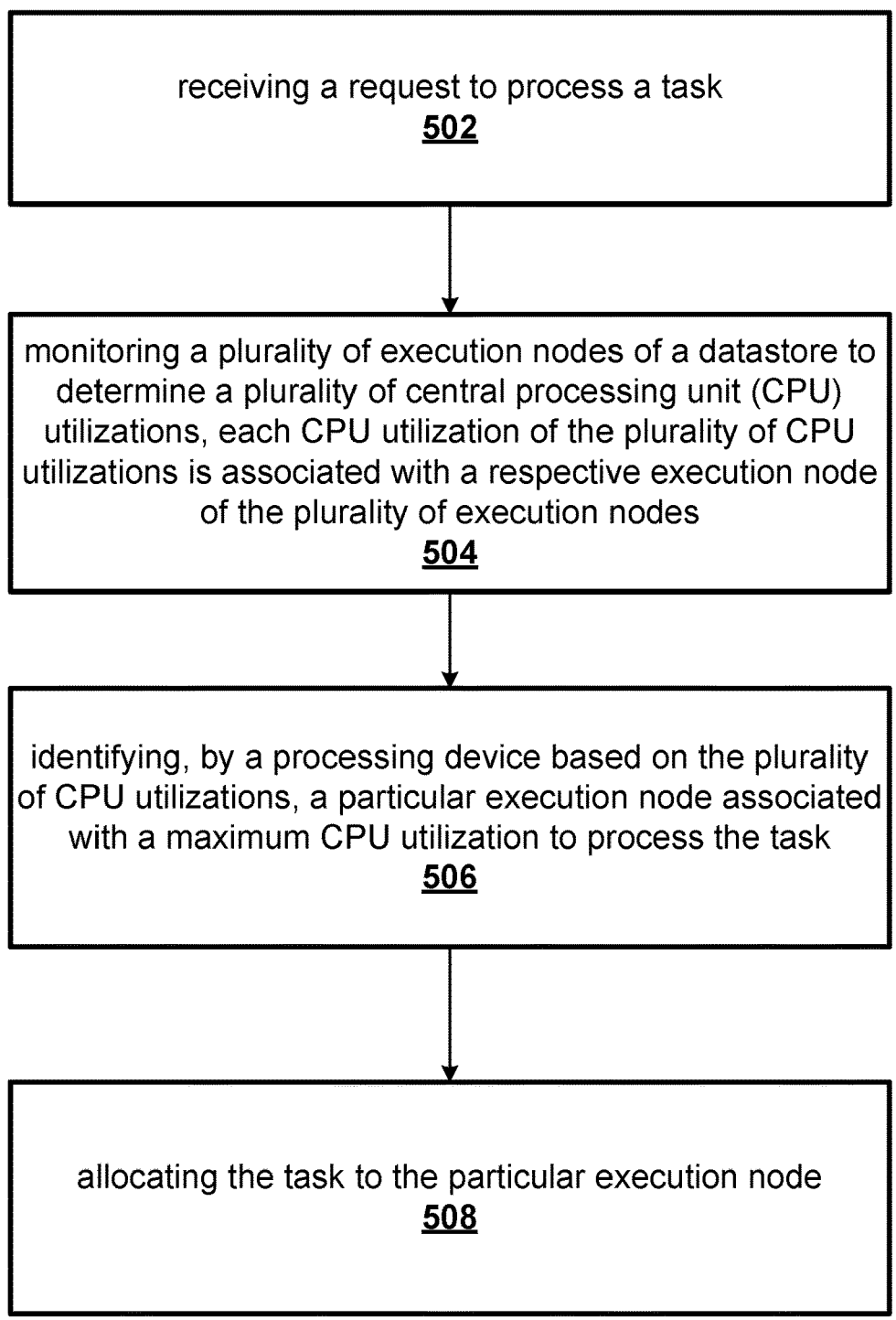
FIG. 5 is a flow diagram depicting a method of dynamic task allocation of a datastore, according to some embodiments.

FIG. 5 is a flow diagram depicting a method of dynamic task allocation of a datastore, according to some embodiments. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, one or more blocks of the method 500 may be performed by one or more resource managers, such as resource manager 102 in FIG. 3. In some embodiments, one or more blocks of the method 500 may be performed by one or more execution platforms, such as execution platform 312 in FIG. 3.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5, the method 500 includes the block 502 of receiving a request to process a task. The method 500 includes the block 504 of monitoring a plurality of execution nodes of a datastore to determine a plurality of central processing unit (CPU) utilizations, each CPU utilization of the plurality of CPU utilizations is associated with a respective execution node of the plurality of execution nodes. The method 500 includes the block 506 of identifying, by a processing device based on the plurality of CPU utilizations, a particular execution node associated with a maximum CPU utilization to process the task. The method 500 includes the block 508 of allocating the task to the particular execution node.

Figure 6:
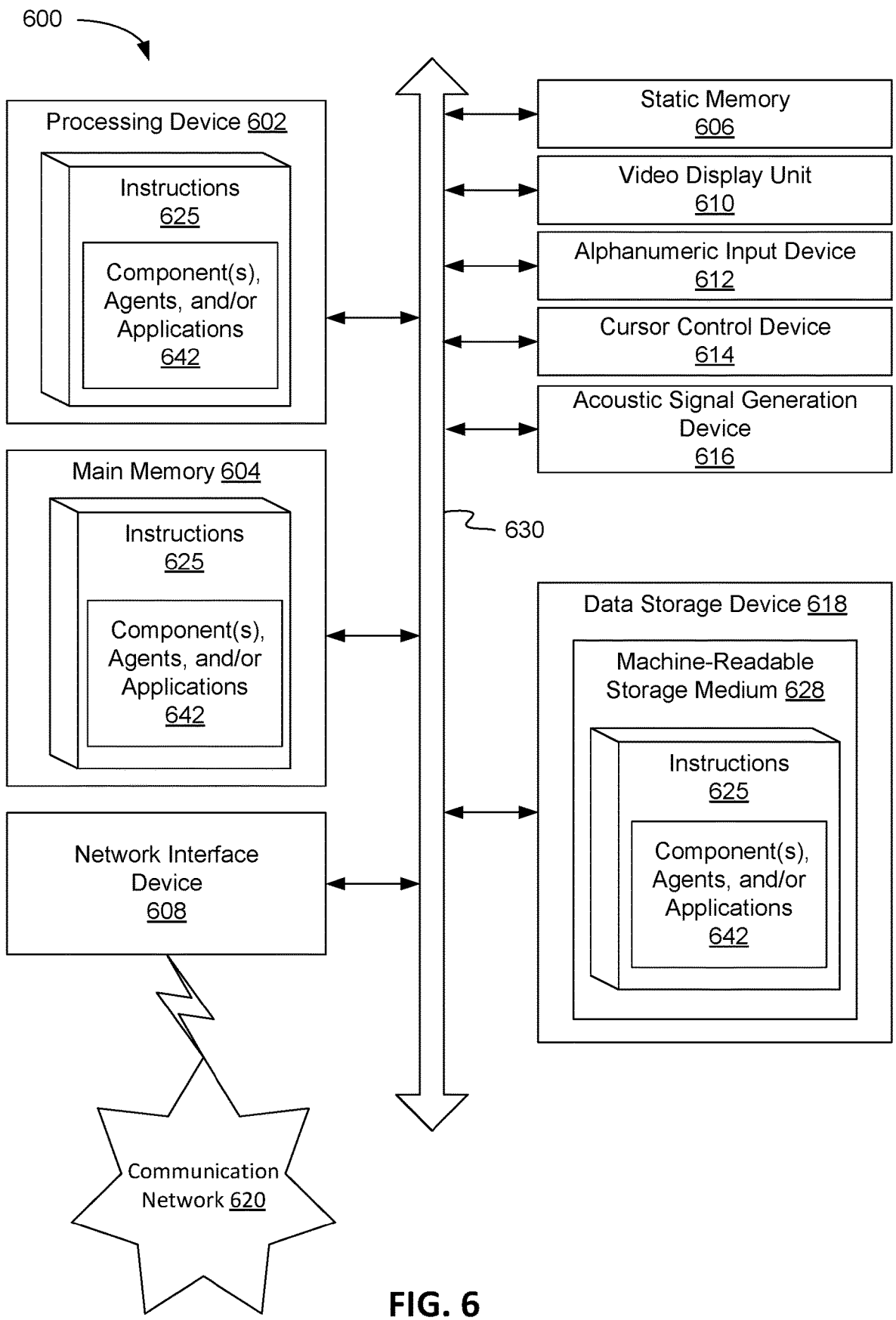
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for one or more components/agents/applications 642 (e.g., TAM agent 410 in FIG. 4, etc.) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

EXAMPLES

The following examples pertain to further embodiments:

Example 1 is a method. The method includes receiving a request to process a task; monitoring a plurality of execution nodes of a datastore to determine a plurality of central processing unit (CPU) utilizations, each CPU utilization of the plurality of CPU utilizations is associated with a respective execution node of the plurality of execution nodes; identifying, by a processing device based on the plurality of CPU utilizations, a particular execution node associated with a maximum CPU utilization to process the task; and allocating the task to the particular execution node.

Example 2 is a method as in Example 2, further including identifying, based on the plurality of CPU utilizations, a second execution node associated with a minimum CPU utilization of the plurality of CPU utilizations; and decommissioning the second execution node responsive to identifying the second execution node being associated with the minimum CPU utilization of the plurality of CPU utilizations.

Example 3 is a method as in any of Examples 1-2, further including generating a mapping including the plurality of CPU utilizations associated with a plurality of identifiers of the plurality of execution nodes; and storing the mapping in a database.

Example 4 is a method as in any of Examples 1-3, further including removing, based on one or more guardrail parameters, a second execution node of the plurality of execution nodes as a possible candidate to process the task.

Example 5 is a method as in any of Examples 1-4, wherein the one or more guardrail parameters indicate at least one of a minimum task per execution node, a maximum task per execution node, or a maximum CPU utilization execution node.

Example 6 is a method as in any of Examples 1-5, further including calculating a first moving average of tasks per execution node to process a first set of historical tasks; calculating a second moving average of tasks per execution node to process a second set of historical tasks; and calculating a minimum number of tasks per execution node based on the first moving average and the second moving average.

Example 7 is a method as in any of Examples 1-6, further including determining that the first moving average exceeds the second moving average; and defining the minimum number of tasks per execution node as the first moving average responsive to determining that the first moving average exceeds the second moving average.

Example 8 is a method as in any of Examples 1-7, further including identifying, based on the plurality of CPU utilizations, a third execution node of the plurality of execution nodes as being associated with a minimum CPU utilization of the plurality of CPU utilizations; and removing, based on one or more guardrail parameters, the third execution node of the plurality of execution nodes as a possible candidate for decommission to conform to the minimum number of tasks per execution node.

Example 9 is a method as in any of Examples 1-8, further including determining that a particular task allocated to a second execution node of the plurality of execution nodes involves downloading one or more files for a duration of time; and allocating one or more additional tasks to the second execution node to cause the second execution node to process the one or more additional tasks during the duration of time.

Example 10 is a method as in any of Examples 1-9, wherein the particular execution node included a queue, wherein the queue includes a plurality of task slots, and further including determining that the particular execution node includes only one task slot of the plurality of task slots that is available for the task.

Example 11 is a system. The system includes a memory; and a processing device, operatively coupled to the memory, to receive a request to process a task; monitor a plurality of execution nodes of a datastore to determine a plurality of central processing unit (CPU) utilizations, each CPU utilization of the plurality of CPU utilizations is associated with a respective execution node of the plurality of execution nodes; identify, based on the plurality of CPU utilizations, a particular execution node associated with a maximum CPU utilization to process the task; and allocate the task to the particular execution node.

Example 12 is a system as in Example 11, wherein the processing device is further to identify, based on the plurality of CPU utilizations, a second execution node associated with a minimum CPU utilization of the plurality of CPU utilizations; and decommission the second execution node responsive to identifying the second execution node being associated with the minimum CPU utilization of the plurality of CPU utilizations.

Example 13 is a system as in any of Examples 11-12, wherein the processing device is further to generate a mapping including the plurality of CPU utilizations associated with a plurality of identifiers of the plurality of execution nodes; and store the mapping in a database.

Example 14 is a system as in any of Examples 11-13, wherein the processing device is further to remove, based on one or more guardrail parameters, a second execution node of the plurality of execution nodes as a possible candidate to process the task.

Example 15 is a system as in any of Examples 11-14, wherein the one or more guardrail parameters indicate at least one of a minimum task per execution node, a maximum task per execution node, or a maximum CPU utilization execution node.

Example 16 is a system as in any of Examples 11-15, wherein the processing device is further to calculate a first moving average of tasks per execution node to process a first set of historical tasks; calculate a second moving average of tasks per execution node to process a second set of historical tasks; and calculate a minimum number of tasks per execution node based on the first moving average and the second moving average.

Example 17 is a system as in any of Examples 11-16, wherein the processing device is further to determine that the first moving average exceeds the second moving average; and define the minimum number of tasks per execution node as the first moving average responsive to determining that the first moving average exceeds the second moving average.

Example 18 is a system as in any of Examples 11-17, wherein the processing device is further to identify, based on the plurality of CPU utilizations, a third execution node of the plurality of execution nodes as being associated a minimum CPU utilization of the plurality of CPU utilizations; and remove, based on one or more guardrail parameters, the third execution node of the plurality of execution nodes as a possible candidate for decommission to conform to the minimum number of tasks per execution node.

Example 19 is a system as in any of Examples 11-18, wherein the processing device is further to determine that a particular task allocated to a second execution node of the plurality of execution nodes involves downloading one or more files for a duration of time; and allocate one or more additional tasks to the second execution node to cause the second execution node to process the one or more additional tasks during the duration of time.

Example 20 is a system as in any of Examples 11-19, wherein the particular execution node includes a queue, wherein the queue included a plurality of task slots, and wherein the processing device is further to determine that the particular execution node includes only one task slot of the plurality of task slots that is available for the task.

Example 21 is a non-transitory computer-readable medium storing instructions that, when execute by a processing device of a system, cause the processing device to receive a request to process a task; monitor a plurality of execution nodes of a datastore to determine a plurality of central processing unit (CPU) utilizations, each CPU utilization of the plurality of CPU utilizations is associated with a respective execution node of the plurality of execution nodes; identify, based on the plurality of CPU utilizations, a particular execution node associated with a maximum CPU utilization to process the task; and allocate the task to the particular execution node.

Example 22 is a non-transitory computer-readable medium as in Example 21, wherein the instructions, when executed by a processing device, further cause the processing device to identify, based on the plurality of CPU utilizations, a second execution node associated with a minimum CPU utilization of the plurality of CPU utilizations; and decommission the second execution node responsive to identifying the second execution node being associated with the minimum CPU utilization of the plurality of CPU utilizations.

Example 23 is a non-transitory computer-readable medium as in any of Examples 21-22, wherein the instructions, when executed by a processing device, further cause the processing device to generate a mapping including the plurality of CPU utilizations associated with a plurality of identifiers of the plurality of execution nodes; and store the mapping in a database.

Example 24 is a non-transitory computer-readable medium as in any of Examples 21-23, wherein the instructions, when executed by a processing device, further cause the processing device to remove, based on one or more guardrail parameters, a second execution node of the plurality of execution nodes as a possible candidate to process the task.

Example 25 is a non-transitory computer-readable medium as in any of Examples 21-24, wherein the instructions, when executed by a processing device, wherein the one or more guardrail parameters indicate at least one of a minimum task per execution node, a maximum task per execution node, or a maximum CPU utilization execution node.

Example 26 is a non-transitory computer-readable medium as in any of Examples 21-25, wherein the instructions, when executed by the processing device, further cause the processing device to calculate a first moving average of tasks per execution node to process a first set of historical tasks; calculate a second moving average of tasks per execution node to process a second set of historical tasks; and calculate a minimum number of tasks per execution node based on the first moving average and the second moving average.

Example 27 is a non-transitory computer-readable medium as in any of Examples 21-26, wherein the instructions, when executed by a processing device, further cause the processing device to determine that the first moving average exceeds the second moving average; and define the minimum number of tasks per execution node as the first moving average responsive to determining that the first moving average exceeds the second moving average.

Example 28 is a non-transitory computer-readable medium as in any of Examples 21-27, wherein the instructions, when executed by a processing device, further cause the processing device to identify, based on the plurality of CPU utilizations, a third execution node of the plurality of execution nodes as being associated with a minimum CPU utilization of the plurality of CPU utilizations; and remove, based on one or more guardrail parameters, the third execution node of the plurality of execution nodes as a possible candidate for decommission to conform to the minimum number of tasks per execution node.

Example 29 is a non-transitory computer-readable medium as in any of Examples 21-28, wherein the instructions, when executed by the processing device, further cause the processing device to: determine that a particular task allocated to a second execution node of the plurality of execution nodes involves downloading one or more files for a duration of time; and allocate one or more additional tasks to the second execution node to cause the second execution node to process the one or more additional tasks during the duration of time.

Example 30 is a non-transitory computer-readable medium as in any of Examples 21-29, wherein the particular execution node includes a queue, wherein the queue includes a plurality of task slots, and wherein the instructions, when executed by the processing device, further cause the processing device to determine that the particular execution node includes only one task slot of the plurality of task slots that is available for the task.

Unless specifically stated otherwise, terms such as "receiving," "monitoring," "identifying," "allocating," "generating," "decommissioning," "removing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
receiving a request to process a task;
monitoring a plurality of execution nodes of a datastore to determine a plurality of central processing unit (CPU) utilizations, each CPU utilization of the plurality of CPU utilizations is associated with a respective execution node of the plurality of execution nodes;
adjusting one or more guardrail parameters to maintain a balance between a processing latency associated with the plurality of execution nodes and a power consumption associated with the plurality of execution nodes;
removing, based on the one or more guardrail parameters indicating a maximum allowable CPU utilization, a first execution node from the plurality of execution nodes to prevent an overallocation of tasks onto the first execution node;
identifying, by a processing device based on the plurality of CPU utilizations, a particular execution node associated with a maximum CPU utilization to process the task responsive to removing the first execution node from the plurality of execution nodes;
determining a lag amount associated with the maximum CPU utilization;
preventing an allocation of the task to the particular execution node for a time period that is equal to or greater than the lag amount; and
allocating the task to the particular execution node after the time period has elapsed.

2. The method of claim 1, further comprising:
identifying, based on the plurality of CPU utilizations, a second execution node associated with a minimum CPU utilization of the plurality of CPU utilizations; and
decommissioning the second execution node responsive to identifying the second execution node being associated with the minimum CPU utilization of the plurality of CPU utilizations.

3. The method of claim 1, further comprising:
generating a mapping comprising the plurality of CPU utilizations associated with a plurality of identifiers of the plurality of execution nodes; and
storing the mapping in a database.

4. The method of claim 3, wherein the one or more guardrail parameters further indicate at least one of a minimum task per execution node or a maximum task per execution node.

5. The method of claim 1, further comprising:
calculating a first moving average of tasks per execution node to process a first set of historical tasks;
calculating a second moving average of tasks per execution node to process a second set of historical tasks; and
calculating a minimum number of tasks per execution node based on the first moving average and the second moving average.

6. The method of claim 5, further comprising:
determining that the first moving average exceeds the second moving average; and
defining the minimum number of tasks per execution node as the first moving average responsive to determining that the first moving average exceeds the second moving average.

7. The method of claim 5, further comprising:
identifying, based on the plurality of CPU utilizations, a third execution node of the plurality of execution nodes as being associated with a minimum CPU utilization of the plurality of CPU utilizations; and
removing, based on the one or more guardrail parameters, the third execution node of the plurality of execution nodes as a possible candidate for decommission to conform to the minimum number of tasks per execution node.

8. The method of claim 1, further comprising:
determining that a particular task allocated to a second execution node of the plurality of execution nodes involves downloading one or more files for a duration of time; and
allocating one or more additional tasks to the second execution node to cause the second execution node to process the one or more additional tasks during the duration of time.

9. The method of claim 1, wherein the particular execution node comprises a queue, wherein the queue comprises a plurality of task slots, and further comprising:
determining that the particular execution node includes only one task slot of the plurality of task slots that is available for the task.

10. A system comprising:
a memory; and
a processing device, operatively coupled to the memory, to:
receive a request to process a task;
monitor a plurality of execution nodes of a datastore to determine a plurality of central processing unit (CPU) utilizations, each CPU utilization of the plurality of CPU utilizations is associated with a respective execution node of the plurality of execution nodes;
reduce one or more guardrail parameters to maintain a balance between a processing latency associated with the plurality of execution nodes and a power consumption associated with the plurality of execution nodes;
remove, based on the one or more guardrail parameters indicating a maximum allowable CPU utilization, a first execution node from the plurality of execution nodes to prevent an overallocation of tasks onto the first execution node;
identify, based on the plurality of CPU utilizations, a particular execution node associated with a maximum CPU utilization to process the task responsive to removing the first execution node from the plurality of execution nodes;
determine a lag amount associated with the maximum CPU utilization;
prevent an allocation of the task to the particular execution node for a time period that is equal to or greater than the lag amount; and allocate the task to the particular execution node after the time period has elapsed.

11. The system of claim 10, wherein the processing device is further to:
identify, based on the plurality of CPU utilizations, a second execution node associated with a minimum CPU utilization of the plurality of CPU utilizations; and
decommission the second execution node responsive to identifying the second execution node being associated with the minimum CPU utilization of the plurality of CPU utilizations.

12. The system of claim 10, wherein the processing device is further to:
generate a mapping comprising the plurality of CPU utilizations associated with a plurality of identifiers of the plurality of execution nodes; and
store the mapping in a database.

13. The system of claim 10, wherein the one or more guardrail parameters further indicate at least one of a minimum task per execution node or a maximum task per execution node.

14. The system of claim 10, wherein the processing device is further to:
calculate a first moving average of tasks per execution node to process a first set of historical tasks;
calculate a second moving average of tasks per execution node to process a second set of historical tasks; and
calculate a minimum number of tasks per execution node based on the first moving average and the second moving average.

15. The system of claim 14, wherein the processing device is further to:
determine that the first moving average exceeds the second moving average; and
define the minimum number of tasks per execution node as the first moving average responsive to determining that the first moving average exceeds the second moving average.

16. The system of claim 14, wherein the processing device is further to:
identify, based on the plurality of CPU utilizations, a third execution node of the plurality of execution nodes as being associated a minimum CPU utilization of the plurality of CPU utilizations; and
remove, based on the one or more guardrail parameters, the third execution node of the plurality of execution nodes as a possible candidate for decommission to conform to the minimum number of tasks per execution node.

17. The system of claim 10, wherein the processing device is further to:
determine that a particular task allocated to a second execution node of the plurality of execution nodes involves downloading one or more files for a duration of time; and
allocate one or more additional tasks to the second execution node to cause the second execution node to process the one or more additional tasks during the duration of time.

18. The system of claim 10, wherein the particular execution node comprises a queue, wherein the queue comprises a plurality of task slots, and wherein the processing device is further to:
determine that the particular execution node includes only one task slot of the plurality of task slots that is available for the task.

19. A non-transitory computer-readable medium storing instructions that, when execute by a processing device, cause the processing device to:
receive a request to process a task;
monitor a plurality of execution nodes of a datastore to determine a plurality of central processing unit (CPU) utilizations, each CPU utilization of the plurality of CPU utilizations is associated with a respective execution node of the plurality of execution nodes;
adjust one or more guardrail parameters to maintain a balance between a processing latency associated with the plurality of execution nodes and a power consumption associated with the plurality of execution nodes;
remove, based on the one or more guardrail parameters indicating a maximum allowable CPU utilization, a first execution node from the plurality of execution nodes to prevent an overallocation of tasks onto the first execution node;
identify, based on the plurality of CPU utilizations, a particular execution node associated with a maximum CPU utilization to process the task responsive to removing the first execution node from the plurality of execution nodes;
determine a lag amount associated with the maximum CPU utilization;
prevent an allocation of the task to the particular execution node for a time period that is equal to or greater than the lag amount; and
allocate the task to the particular execution node after the time period has elapsed.

20. The non-transitory computer-readable medium of claim 19, wherein the instructions, when executed by the processing device, further cause the processing device to:
identify, based on the plurality of CPU utilizations, a second execution node associated with a minimum CPU utilization of the plurality of CPU utilizations; and
decommission the second execution node responsive to identifying the second execution node being associated with the minimum CPU utilization of the plurality of CPU utilizations.

21. The non-transitory computer-readable medium of claim 19, wherein the instructions, when executed by the processing device, further cause the processing device to:
generate a mapping comprising the plurality of CPU utilizations associated with a plurality of identifiers of the plurality of execution nodes; and
store the mapping in a database.

22. The non-transitory computer-readable medium of claim 19, wherein the one or more guardrail parameters further indicate at least one of a minimum task per execution node or a maximum task per execution node.

23. The non-transitory computer-readable medium of claim 19, wherein the instructions, when executed by the processing device, further cause the processing device to:
calculate a first moving average of tasks per execution node to process a first set of historical tasks;
calculate a second moving average of tasks per execution node to process a second set of historical tasks; and
calculate a minimum number of tasks per execution node based on the first moving average and the second moving average.

24. The non-transitory computer-readable medium of claim 23, wherein the instructions, when executed by the processing device, further cause the processing device to:
determine that the first moving average exceeds the second moving average; and define the minimum number of tasks per execution node as the first moving average responsive to determining that the first moving average exceeds the second moving average.

25. The non-transitory computer-readable medium of claim 23, wherein the instructions, when executed by the processing device, further cause the processing device to:
   identify, based on the plurality of CPU utilizations, a third execution node of the plurality of execution nodes as being associated with a minimum CPU utilization of the plurality of CPU utilizations; and
   remove, based on the one or more guardrail parameters, the third execution node of the plurality of execution nodes as a possible candidate for decommission to conform to the minimum number of tasks per execution node.

26. The non-transitory computer-readable medium of claim 19, wherein the instructions, when executed by the processing device, further cause the processing device to:
   determine that a particular task allocated to a second execution node of the plurality of execution nodes involves downloading one or more files for a duration of time; and
   allocate one or more additional tasks to the second execution node to cause the second execution node to process the one or more additional tasks during the duration of time.

27. The non-transitory computer-readable medium of claim 19, wherein the particular execution node comprises a queue, wherein the queue comprises a plurality of task slots, and wherein the instructions, when executed by the processing device, further cause the processing device to:
   determine that the particular execution node includes only one task slot of the plurality of task slots that is available for the task.

\* \* \* \* \*